United States Patent [19]

Tournier

[11] 4,297,764
[45] Nov. 3, 1981

[54] METHOD AND INSTALLATION FOR PROCESSING BOVINE FEET

[76] Inventor: Claude Tournier, Lioujas, 12000 Rodez, France

[21] Appl. No.: 95,247

[22] Filed: Nov. 19, 1979

[30] Foreign Application Priority Data

Apr. 12, 1978 [FR] France .................................. 78 34720
Apr. 12, 1978 [FR] France .................................. 78 34721
May 30, 1979 [FR] France .................................. 79 13786

[51] Int. Cl.³ .......................... A22B 5/08; A22C 17/04
[52] U.S. Cl. ........................................ 17/46; 17/1 R; 17/1 G; 17/13
[58] Field of Search .................. 17/1 R, 45, 46, 47, 17/51, 52, 1 G, 13, 15

[56] References Cited

U.S. PATENT DOCUMENTS

| | | | |
|---|---|---|---|
| 2,505,964 | 5/1950 | Hincks | 17/1 R |
| 2,870,478 | 1/1959 | Schuster | 17/1 R |
| 3,882,570 | 5/1975 | Zwiep et al. | 17/1 R |

FOREIGN PATENT DOCUMENTS

| | | | |
|---|---|---|---|
| 897370 | 4/1972 | Canada | 17/1 R |
| 951062 | 7/1974 | Canada | 17/1 R |
| 2403929 | 8/1975 | Fed. Rep. of Germany | 17/1 R |
| 2159588 | 6/1973 | France | 17/1 R |
| 592417 | 10/1977 | Switzerland | 17/1 R |
| 282955 | 3/1972 | U.S.S.R. | 17/1 R |

*Primary Examiner*—Willie G. Abercrombie
*Attorney, Agent, or Firm*—Larson and Taylor

[57] ABSTRACT

The invention relates to an improvement in the method of processing bovine feet in which the feet are washed, scalded, dehoofed and depilated. After having dehoofed the feet and having removed the spurs therefrom, the boning operation or scraping operation is carried out, following which the flesh portion or the skins obtained separate from the bone portions are scalded and depilated. The invention also provides an installation for operating this method which can be automatized.

25 Claims, 17 Drawing Figures

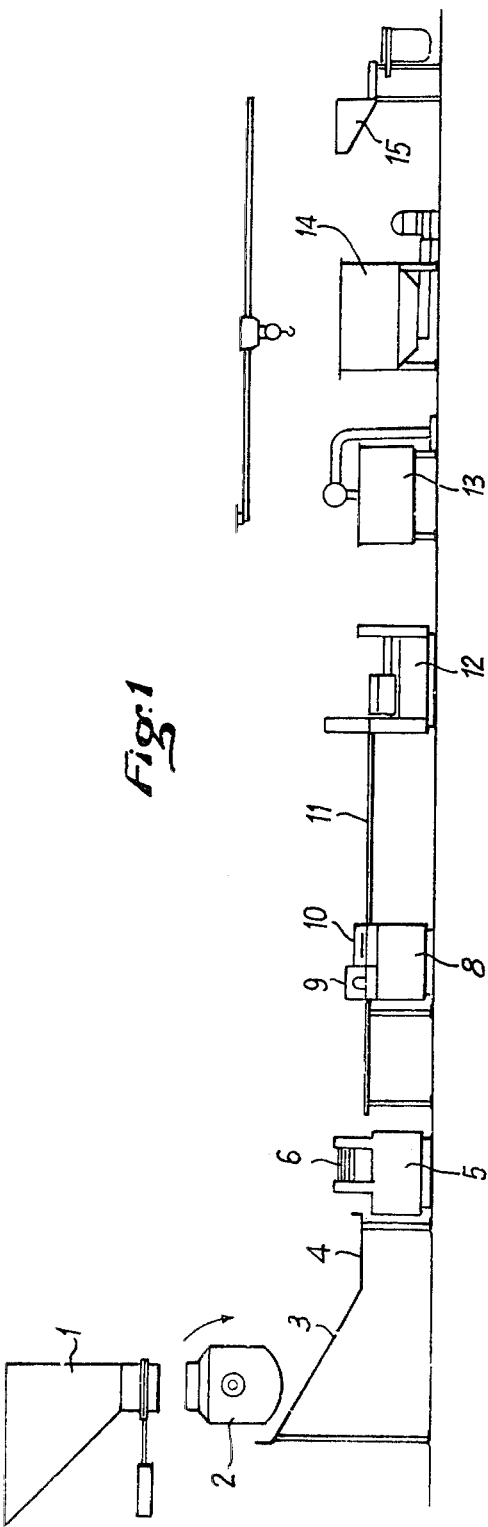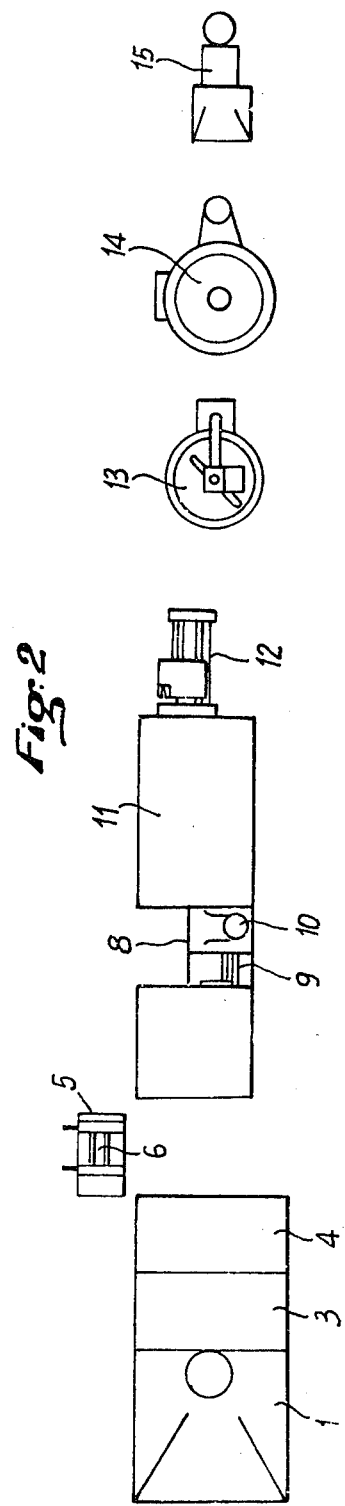

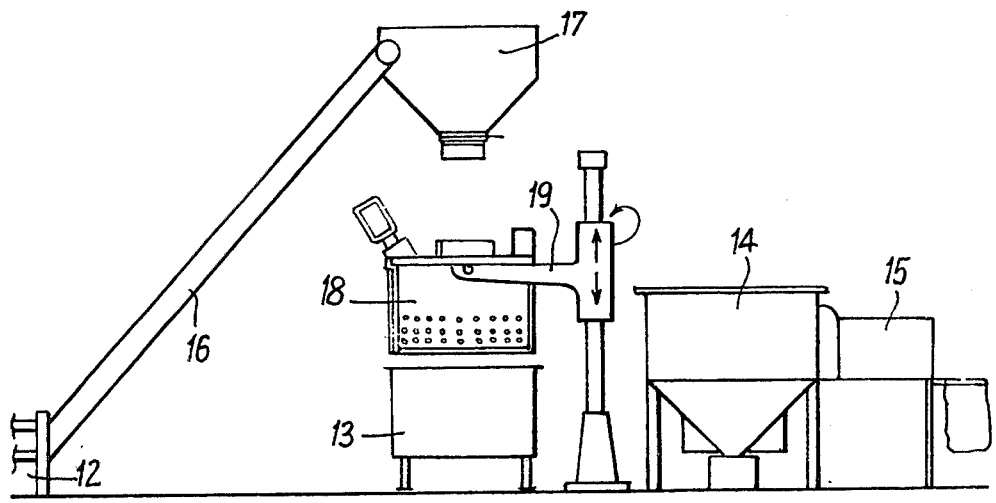
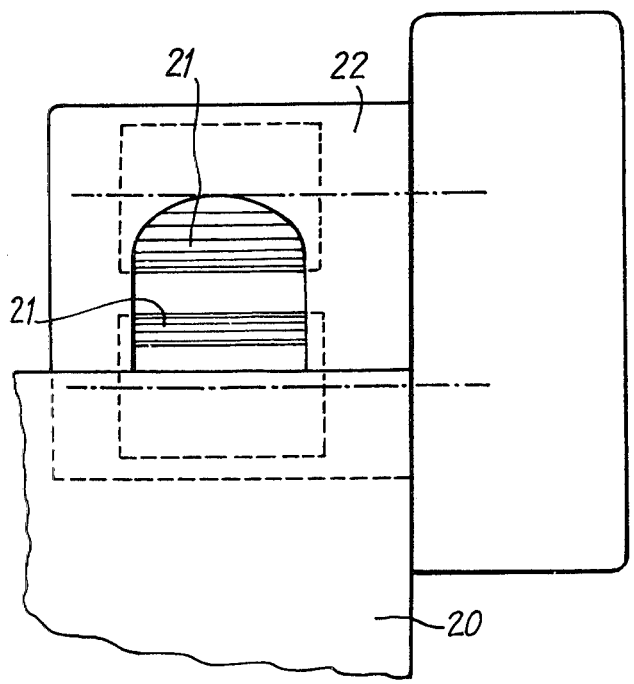
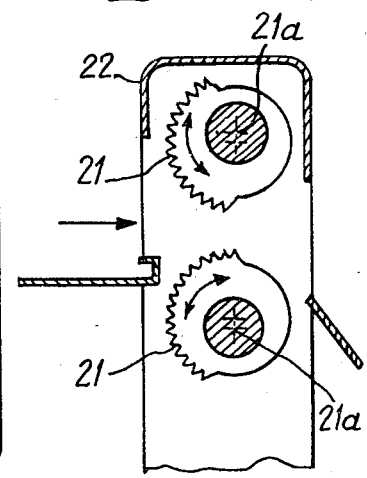

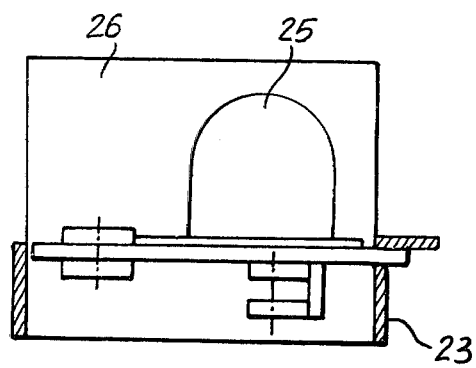
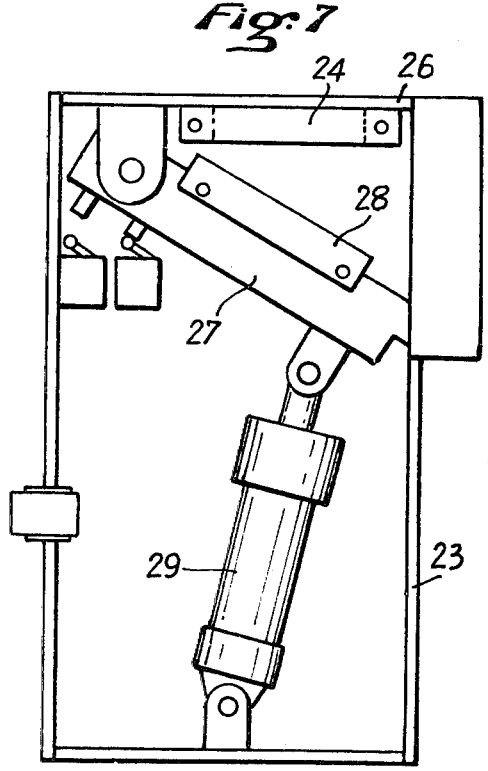
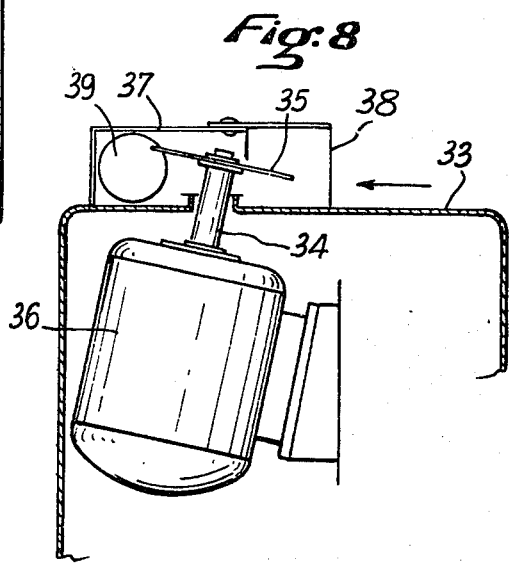

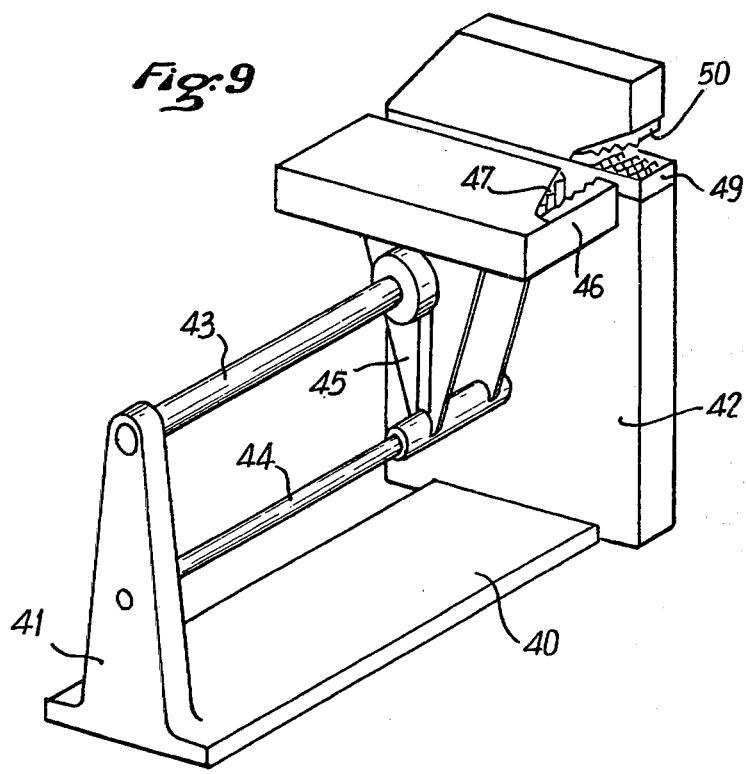
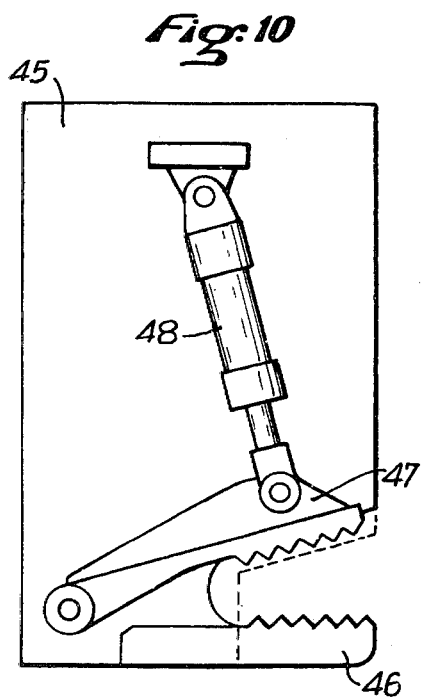
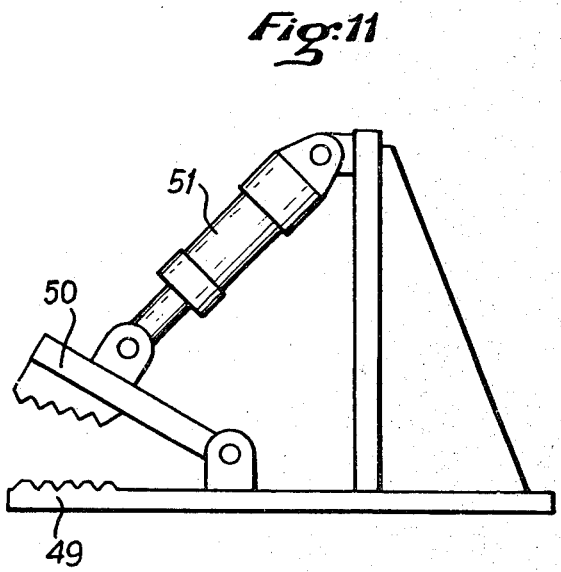

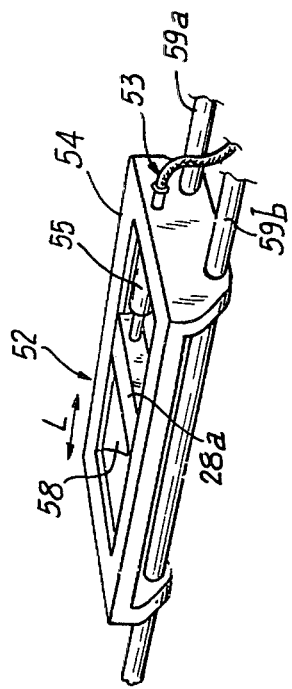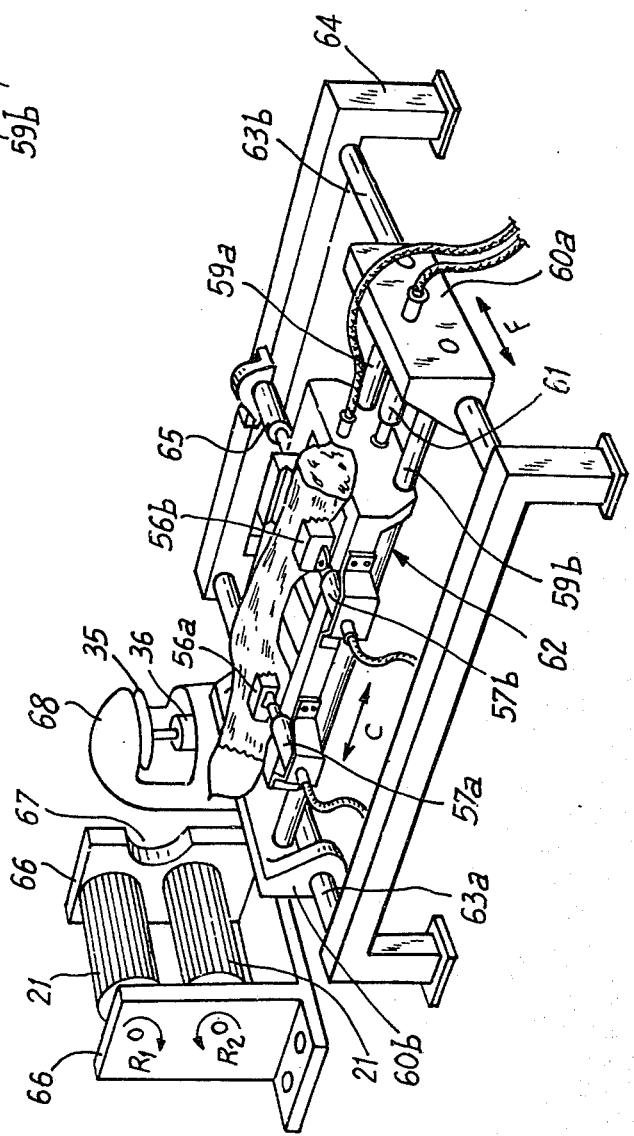

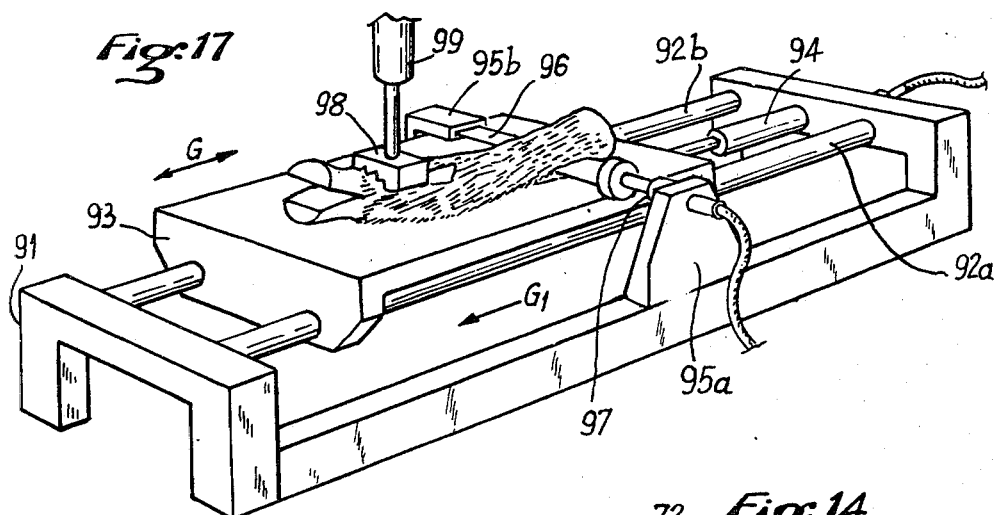
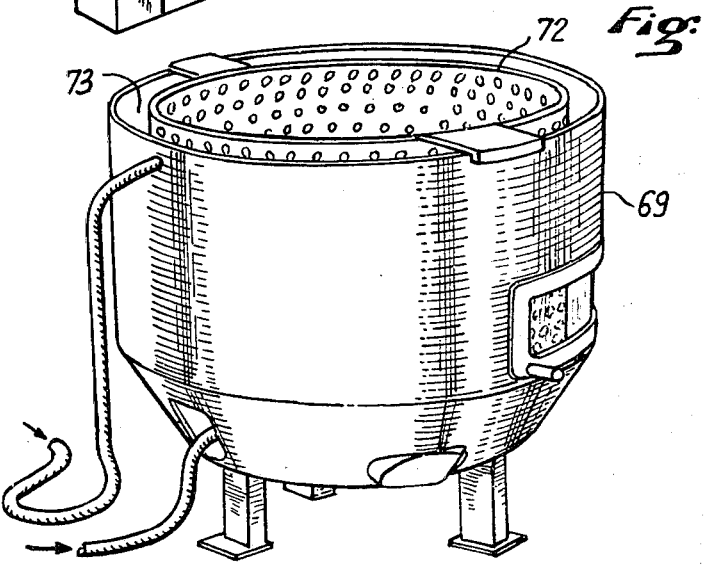
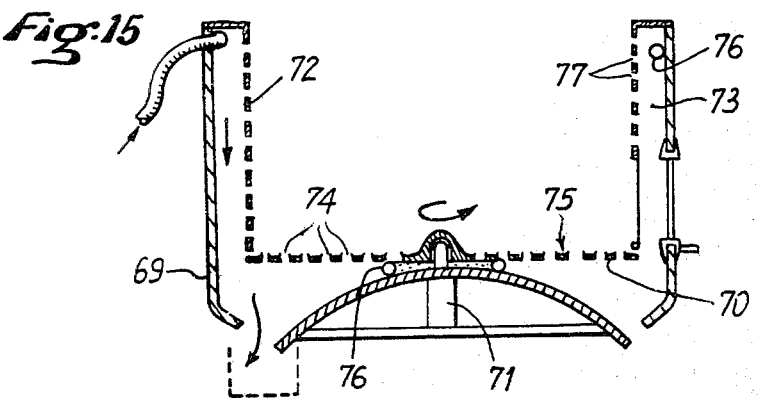

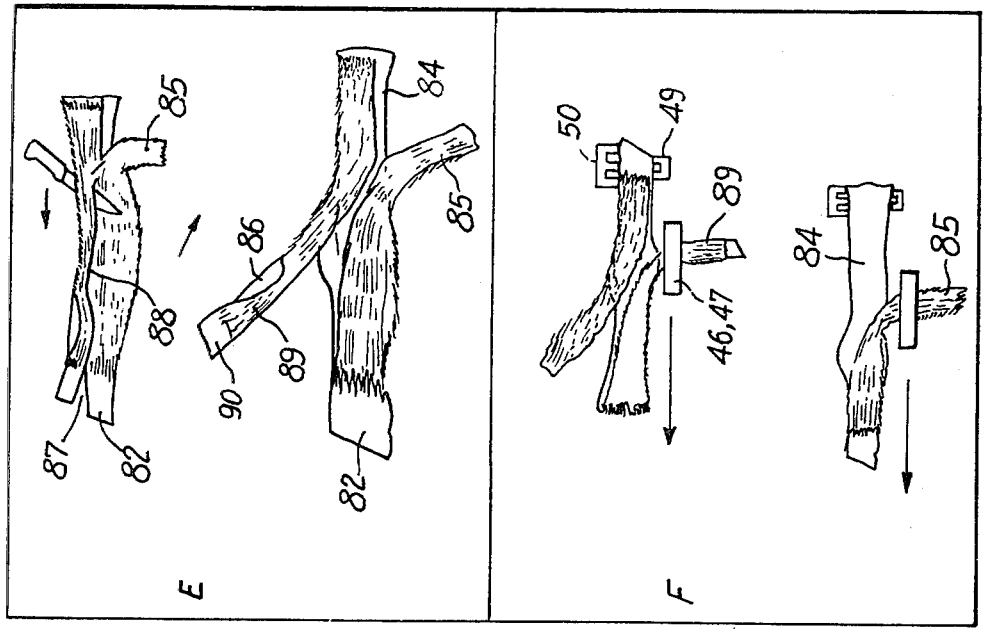
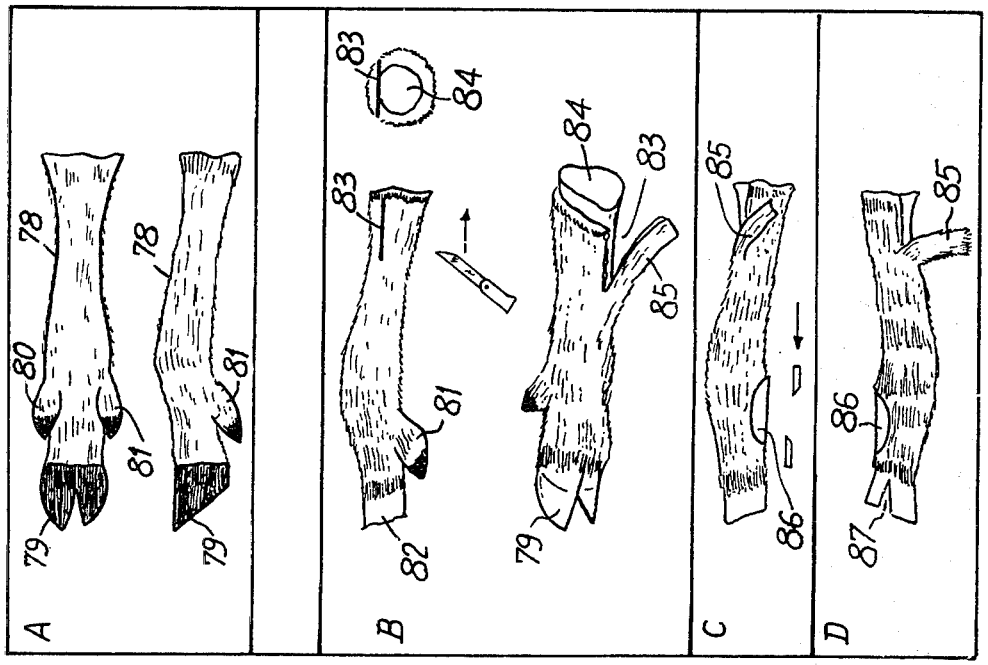
Fig. 16

METHOD AND INSTALLATION FOR PROCESSING BOVINE FEET

BACKGROUND OF THE INVENTION

1. Field of the Invention

The present invention relates to a method for processing bovine feet, that is to say feet of bovine cattle and sheep, for application in slaughter-houses, as well as to an installation for the application of this method.

By "bovine feet" is meant, in the sense of the present invention, the portion of the foot which extends below the knee joint or the hock and ends at the hoof.

2. Description of the Prior Art

It is known that, in slaughter-houses, these feet are processed, after cutting off, to separate from them the various constituent elements destined for the production of byproducts, such as fertilizers, gelatin, etc.

Methods of processing presently known are essentially manual, even if they may include machines for certain operations. These methods consist principally of washing the feet, then scalding them, dehoofing them, depilating them and then boning them.

Certain delicate operations, such as boning, or scraping, are generally carried out manually, whilst other operations, such as for example dehoofing, are sometimes carried out by means of special machines.

These methods, which take place in the slaughter-houses, require numerous, relatively qualified personnel, working under difficult conditions. Working rates are low and productivity is low. Their use results in a considerable consumption of water, which is run to waste highly polluted.

It is an object of the present invention to overcome these drawbacks and to provide a method enabling the labor used to be substantially reduced.

It is another object of the invention to increase considerably the hourly production rate.

It is a further object of the invention to provide a method which economizes a considerable amount of water.

It is yet another object of the invention to provide an installation for the application of a method which enables a high degree of automatization to be achieved for a relatively low level of investment.

Other objects and advantages will become apparent from the description which follows.

GENERAL DESCRIPTION OF THE INVENTION

According to the invention there is provided a method of processing bovine feet, notably feet of bovine cattle and of sheep, in which the feet are washed, they are scalded, they are dehoofed and depilated, characterized by the fact that after having dehoofed the feet and having removed the spurs therefrom, they are boned or scraped, following which the fleshy carcasses or skins obtained separately from the bony portions are scalded and they are depilated.

In a preferred embodiment of the method according to the invention, preferably after having dehoofed the feet and sheared the spurs from the feet, cuts are made, either manually, or by means of a cutting device, such as a saw, at one at least and, preferably, at both ends, following which a hanging portion or flap of the flesh is gripped, close to the corresponding end to pull it in the direction of the other end, thus causing the separation of the flesh from the bony elements.

In accordance with a particularly advantageous feature of the invention, the cuts made before the boning are distributed in the following manner: a cut tangentially to the bone, from the upper end of the foot, on the front side, over a length of about 10 cm for a foot of beef, creating two parallel slits; a cut in the osteo-chondral part of the other end, of lengths of about 5 cm separating the cartilaginous part on the posterior side of this end from the sub-adjacent bony portion; and a cut tangential to the bone defining two slits running respectively from the bottoms of the slits of the first cut towards the osteo-chondral cut and defining a postero-inferior flap comprising the cartilaginous part separated from the bone and an anterosuperior flap.

The boning is carried out holding the foot by a bony end, by pulling the flap close to this end towards the opposite end, then by holding the other bony end and by pulling the other flap in the same way.

The fleshy carcasses obtained after boning are then introduced into a scalding bath and it is then possible to depilate them advantageously, either inside the scalding bath, or after having extracted them from the bath. In accordance with an advantageous feature of the invention, an amount of scalding water of 2 l per kg of flesh is used.

The depilation is done preferably by scraping the fleshy carcasses by means of suitably arranged scraper means.

By means of the method according to the invention, the time of depilation of a fleshy carcass can be of the order of 3 min. and the hourly production of carcasses per person employed may be advantageously of the order of 100.

According to another aspect of the invention there is provided an installation for practising this novel method, comprising stations of washing, dehoofing, scalding, depilating and boning or scraping, which installation is characterized by the fact that the boning station is arranged before the scalding station and, preferably, after the dehoofing station.

In accordance with the invention, the boning station may advantageously be preceded by one or several cutting or starting stations.

In accordance with a preferred embodiment of the invention, the cutting station, which follows, for example, a spur shearing station, comprises cutting means such as, for example, a circular saw, the foot being presented to said saw, preferably on a suitable support, by an operator so as to make a cut slightly inclined in the osteo-chondral end to separate the postero-inferior cartilaginous portion from the sub-adjacent bony portion.

The boning station may advantageously include a boning machine comprising a fixed gripping member fast to a frame of the machine, constituted, for example, by a set of jaws holding the foot to be boned by its end, and a movable extraction member constituted also by at least one set of jaws gripping the corresponding flap of the foot to disengage it from the bone, one of the jaws of the movable extraction member moving preferably in a plane parallel to the plane of movement of said movable member, whilst one of the jaws of the fixed gripping member is moved in a plane perpendicular to said plane.

In a particularly preferred embodiment of the invention, the depilation station includes, in a tank receiving the fleshy carcasses, scraper means constituted by one or several surfaces provided with a plurality of orifices of which the contour has a sharp edge directed towards said carcasses, certain at least of said surfaces being driven in a relative movement with respect to said carcasses.

Particularly advantageously, this station can include an upwardly open tank and a horizontal perforated plate arranged in its lower part and rotated, said plate bearing said orifices with their edges, the carcasses being contained inside the tank in a fixed perforated cylinder whose bottom is formed by said plate.

If necessary, it is possible to carry out the scalding in said tank by providing the latter with hot water inlet means.

The transfer between the various stations may be done manually or by means of conveyor belts of suitable type.

Other advantages and features of the invention will appear from reading the following description, given by way of non-limiting example and with reference to the accompanying drawings.

BRIEF DESCRIPTION OF THE DRAWINGS

In the drawings:

FIG. 1 shows a diagrammatic view in elevation of an embodiment of an installation according to the invention;

FIG. 2 shows a diagrammatic view from above of this installation;

FIG. 3 shows a view in elevation of a modification of the terminal portion of an installation according to the invention;

FIG. 4 shows a diagrammatic view in elevation of a dehoofing machine;

FIG. 5 shows a view in section of this machine;

FIG. 6 shows a diagrammatic view of a spur shearing machine;

FIG. 7 shows a view from above of this machine, the protective table being removed;

FIG. 8 shows a diagrammatic view of a sawing machine according to the invention;

FIG. 9 shows a perspective view of a boning station according to the invention;

FIGS. 10 and 11 show views of the jaws of the boning station and their actuating means;

FIG. 12 shows a diagrammatic view in perspective of a combined station for dehoofing, spur shearing and sawing according to the invention;

FIG. 13 shows a view in detail of the embodiment of FIG. 12;

FIG. 14 shows a perspective view of a depilating station according to the invention;

FIG. 15 shows a view in diametric cross-section of this station;

FIG. 16, composed of diagrams A to F, shows diagrammatically the various stages of the processing of an ox foot;

FIG. 17 shows a perspective view of a boning starting station.

DESCRIPTION OF PREFERRED EMBODIMENTS

Reference is first made to FIGS. 1 and 2.

The installation shown includes a preparatory station supplied by a hopper 1 into which a certain number of beef feet are tipped and which supplies a washing tank 2 rotatable in the direction of the arrow around a horizontal axis. Water inlet and removal means (not shown) are provided, as well as means for stirring the feet in the tank. When the feet are clean, the tank 2 is tilted around its axis and pours the feet on to an inclined plane 3 which causes them to slide into a waiting zone 4. From there, an operator takes the feet one by one and presents them to a dehoofing device 5, provided with sectors of cylinders 6 rotating around horizontal axes. After dehoofing, the feet are preferably routed directly to a shearing-cutting station 8 comprising a shearing machine 9 and a sawing machine 10. From there, the operator working this station 8 places the feet on a waiting table 11 where the other cutting operations are carried out manually. From the table 11, the feet are brought to the boning station 12. At this spot, the bones are removed whilst the fleshy carcasses, which comprise the flesh and skin, are sent to a scalding station 13, then to a depilating station 14 and finally to a wrapping station 15 to be wrapped for freezing.

A certain number of the handling operations which are carried out manually in such an installation may be automatic and it is shown, in FIG. 3, that from the boning station 12, the carcasses are taken up again by an ascending conveyor belt 16 towards a hopper 17 capable of supplying a stirring and transfer tank 18 borne by a rotary and vertically sliding arm 19 capable of dipping into the tank 18 in the tank of the scalding station 13, re-emerging from this tank, rotating it and bringing the vat into the tank of the depilating machine 14. In the same way, conveyor belts may be provided between the various other stations, for example, between the waiting table 4 and the dehoofing device 5.

Reference will now be made to FIGS. 4 and 5.

The dehoofing machine 5 comprises a frame 20 inside of which are arranged drive means and suitable control means. At the upper part of the frame are mounted two grooved sectors of cylinders 21 rotating around eccentric horizontal axes 21a and partly masked by hoods 22 which only allow their neighboring portions to appear. The starting position of the sectors 21 is that of the drawing, in which the gap separating them is the smallest. The sectors rotate in opposite directions drawing the hoof and increasing the gap. After having rotated by about 150°, they are stopped and then rotate in the opposite direction. The operator holds the foot by its upper end and introduces the end of the hoof between the two sectors which commence the forward rotation, then disengage the foot during the return rotation. Such a machine enables, for example, about 15 feet/minute to be dehoofed.

Experience has shown that with such a machine, it is possible to dehoof the foot even if the latter has not been previously scalded as was done in the prior art.

Reference is now made to FIGS. 6 and 7.

The spur shearing device shown includes, inside a frame 23, a first cutting and shearing element 24 arranged horizontally behind a protective window 25, situated in a vertical plate 26. Around a vertical axis is pivoted a horizontally movable arm 27, bearing the second knife 28 of the shears, this arm 27 being rendered movable by a suitably pivoted jack 29. Preferably, a suitable protection table is arranged above the assembly formed by the jack 29 and the arm 27, this table leaving however a passage between the two knives 24, 28. In operation, the operator introduces through the window 25, a foot with the two spurs arranged downwardly so as to be situated between the knives 24 and 28. The actuation of the movable arm 27 then causes the sectioning of the spurs which drop and are removed. The operator then turns over the foot to present the other spur and the operation is repeated.

Instead of pivoting arms, the movable knife could also be borne by a sliding support.

Reference is now made to FIG. 8.

The sawing station shown includes a horizontal plate 33 from which projects the axle 34 of a circular saw 35 driven by an electric motor 36. A hood 37, open at 38, ensures the protection of the operator whilst permitting the introduction of a foot in the direction of the arrow, the foot sliding on the plate 33. A removal orifice 39 is provided in the hood.

It is seen that the axle 34 is inclined with respect to the vertical by a fairly small angle comprised between 8° and 14° and preferable of the order of 11°. As a result the plane of the saw 35 is not horizontal but inclined by the same angle with respect to the horizontal. The highest point of the saw occurs at about 20 mm above the table 33. This distance may be modified when calves or sheeps feet are processed instead of ox feet.

As a modification, the axle of the saw, instead of projecting from a horizontal table, may project from a vertical table. In this case, the plane of FIG. 8 would not be a vertical plane, but a horizontal plane, the axle 34 being contained in this plane and the saw always remaining slightly inclined with respect to a plane of the table which has become vertical.

Reference is made now to FIG. 9.

The boning machine which is shown in this Figure includes a horizontal frame 40 with two vertical end uprights 41, 42. Between these uprights extend two horizontal guide columns 43 and 44. On these two columns is guided a sliding carriage 45. A jack (not shown) enables the carriage 45 to be separated from the upright 42 and then to be brought back. The carriage 45 has, on one of its lateral surfaces, two jaws, namely a fixed jaw 46 and a movable jaw 47 seen to better advantage in FIG. 10. The movable jaw 47 can be brought closer to the fixed jaw 46 by pivoting in a horizontal plane under the influence of a suitable jack 48. The jaws 46 and 47 are suitably notched.

At the same height, the vertical upright 42 bears a fixed jaw 49 and a movable jaw 50, seen better in FIG. 11, the jaw 50 being capable of being brought closer to the jaw 49 by pivoting in a vertical plane under the influence of a jack 51. It is seen in FIG. 9 that the actuating mechanisms of the jaws are suitably hidden in protective casings. In operation, the operator places a bony end of a foot between the jaws 49 and 50, the foot being directed, from this jaw, in a substantially horizontal direction when it is immobilized therein. The jaws 46 and 47 are brought together to grip one tip whilst the other end of the foot and the carriage 45 is then moved away from the upright 42, drawing with it the flesh portion until it is completely separated from the bone which remains gripped.

In the example shown, the space between the jaws 46, 47 is extended in a direction substantially parallel to the columns 43, 44. As a modification, this gap could be substantially perpendicular to the columns.

In the same way, as a modification, instead of using a sliding movement of the carriage 45, to separate it from the upright 42 and from the jaws 49, 50, a pivoting movement could be used.

Reference is now made to FIGS. 12 and 13.

In this embodiment, the same device carries the dehoofing station with its sectors 21 suitably protected, the sawing station with its inclined saw 35 and the spur shearing station.

The shearing station 52 is constituted by a carriage 53 formed at its upper part by a rectangular frame 54 shown more clearly in FIG. 13. In the latter a movable blade 28a is arranged (arrow L) sliding on the two longitudinal sides of said frame and controlled by a jack 55 whose body is fixed to a lateral side and the head supported on said blade.

On the frame is also installed a gripping member composed of two sets of jaws 56a and 56b, controlled simultaneously and respectively by two jacks 57a and 57b.

As can be seen in FIG. 12, the foot to be processed is held on the frame 54 by the sets of jaws 56a and 56b, taking care to engage the two lateral spurs in a window 58 defined by the other lateral side of said frame and the blade 28a in resting position. It suffices, at the desired moment, to actuate the jack 55 for the spurs to be cut by the blade and fall into a vat designed to collect them.

The frame or chassis 54 is slideably mounted (arrow C) on two guide rails 59a and 59b fast to two flanges 60a and 60b. The movements C of this frame 54 are subject to the movements of a horizontal jack 61.

The jack 11 could also control the movements L of the movable blade 28a. To do this, the lateral slide of the frame 54 would be traversed from side-to-side by the rod of the jack 61 which would be supported directly on the blade. Thus, in actuating the jack 61, the blade would be displaced, cutting the two lateral spurs then being supported on the other lateral side of the frame, drawing the latter in its path.

The rails 59-flanges 60 assembly defines a carriage 62 which, it also is slideably mounted on two guide rails 63a, 63b, perpendicular to the rails 9a, 9b and fastened to the frame 64. The movements (arrow F) of this carriage are sensitive to the movements of the rod of a jack 65 whose body is fixed to the frame 64.

The dehoofing station, for its part, is constituted by two fluted cylinders or sectors 21. These cylinders, in rotation on parallel axles superposed and borne by two bearing-supports 66, are driven in reverse rotation R1 and R2 by means, for example, of a hydraulic motor (not shown), to tear off the hoof of the foot which becomes engaged in the space bounded between them. It will be noted that one of the bearing-supports 66 is provided with a notched portion 67 permitting the passage of the leg whose hoof has just been torn off by the cylinders, to the cutting station. The latter is constituted by a circular saw 35 driven by a motor 36 and protected by a caisson 68. The plane of the saw 35 is inclined with respect to the horizontal in order to obtain the desired penetration between the bone and the cartilage, on the end of the foot.

The operation of the machine 1 is made auotmatic by connecting the supplies of the jacks to a programmed hydraulic generating source.

The foot to be treated is placed on the frame 54 of the shearing station by arranging the hoof opposite the dehoofing station and by engaging the two lateral spurs in the window 58, and then placing the programmed hydraulic center in operation.

In a first stage, the jack 57a and 57b are supplied simultaneously, actuating the sets of jaws 56a and 56b to imprison the foot to be processed between them.

In a second stage, the jack 61 is supplied, moving the chassis towards the two grooved cylinders.

In a third stage, the jack 65 is supplied, moving the carriage towards the saw 35 of the cutting station which effects the desired incision on the end of the dehoofed foot.

In a fourth stage, the jack 61 is no longer supplied, bringing back the frame 54 to the rail 63b.

In a fifth stage, simultaneously the jack 61 is no longer supplied and the jack 55 is supplied: the first brings back the carriage to its starting position whilst the second actuates the movable blade 28a which cuts the two lateral spurs.

In a sixth and last stage, the jacks 55, 57a and 57b are no longer supplied, releasing the window 58 and the foot so that the machine is again ready to operate for the processing of a further foot.

Reference is now made to FIGS. 14 and 15.

The machine arranged at the depilating station includes a vat 69 whose upper part is cylindrical and upwardly open and lower part is conical. At the level of the bottom of the cylindrical part is arranged, in the vat, a horizontal circular perforated plate 70, rotatable on the central pivot 71 by known drive means. This plate is surmounted peripheraly by a cylinder 72, also perforated, fixed and fast to the vat, with which it defines an annular space 73.

The perforations 74 of the rotary plate are preferably of circular shape, with a diameter comprised between 20 mm and 35 mm and, preferably, of the order of 28 mm. The perforations are surrounded by a sharp edge 75 oriented towards the upper part of the plate, defining at the mouth of the perforation of circular cutting edge. The height of each edge with respect to the upper surface of the plate is of the order of 2 mm.

In operation, a plurality of scalded carcasses is introduced into the cylinder 72 on to the plate 70, and then the vat is closed by means of a suitable cover, not shown. The ramps 76 are fed with a spray of water and the rotation of the plate 70 is initiated. The hairs torn off by the edges 75 of the orifices are projected by the centrifugal force of the plate, either through said orifices 74, or through the opening 77 of the cylinder into the annular space, and then are drawn, in the direction of the arrow, to the recovery tanks. At the end of the operation, the depilated carcasses are withdrawn.

Preferably, such a machine includes a plate having a diameter comprised between 1 m and 1.3 m and a rotary speed comprised between 300 and 450 rpm.

It is noteworthy that, in a simple manner, complete depilation of the carcasses is achieved without risk of laceration or deorganization, in spite of the absence of a rigid element such as a bone inside the carcasses.

Reference will be made to various diagrams of FIG. 16 is which the detail of the various operations, capable of being carried out on the animal feet by the method according to the invention, will now be explained.

An animal foot is represented in the Diagram A from top view and from a left hand side view. The foot includes the foot 78 proper, the hoof 79 and two lateral spurs 80 and 81.

Diagram B shows a left hand side view of the dehoofed foot and the bony end 82 of the hoof side is seen. The foot receives, on the side opposite the hoof, an incision 83 tangential to the shin bone 84 but not touching it, this incision 83 being effected at the upper part of the foot to create two lateral slits enabling a flap 85 to be obtained of length of the order of 100 mm as is seen on the foot shown in perspective in Diagram B.

This first start can be done manually, but it is conceivable that it could also be done by means of a mechanical cutting member.

Diagram C shows the foot after shearing the spur 79, 80, leaving the wounds 86.

Diagram D shows the manner in which the cutting of the front portion of the foot is done, this cutting 87 being effected, as has been seen, with a certain inclined angle of the saw over a length of about 50 mm at the posterior portion of the foot, that is to say on the side of the spurs.

The upper drawing of Diagram E shows the production of the second commencement of boning. This second commencement is effected manually with a knife and the knife is seen in initial position, after it has been driven in tangentially to the bone 84 and tranversely to the greatest length of the latter, on the posterior side of the foot, that is to say on the side opposite that of the first start of boning 83. Once the knife has been driven in transversely, the operator continues the operation by scraping the bony portion, thus forming two slits, of which one 88 is seen in the upper drawing of Diagram E, the other being substantially parallel, these slits ending at the end of the slit 87 formed in the bony portion. A slight cut with the point of the knife enables the slits to be extended to the right up to the start 83 of the initial boning, so that a general arrangement is obtained as shown in the lower drawing of Diagram E with the first flap 85 which is extended by a portion adhering to the bony structure, and the second flap 89, opposite the first and comprising the cartilaginous portion 90 separated from the bony portion 82 by the cut 87.

Referring to Diagram F, it is seen how the boning of the second flap is achieved, which is gripped in the axially movable pinchers 46, 47 of the boning machine, whilst the end 82 on the hoof side is held in the fixed pincers 49, 50 of this machine. The axial translation movement of the movable pincers causes without difficulty the complete boning of the portion belonging to this flap 89.

The lower drawing of the Diagram F shows how the first flap 85 is removed, after having disengaged the foot from the fixed pincers, having turned it over to grip, by means of the fixed pincer, the end opposite the hoof, the movable pincer then taking up the flap 85 for the boning.

Referring to FIG. 17, a device is seen enabling the starting cuts for boning to be carried out automatically.

On a frame 91 are fixed two horizontal guide rails 92a, 92b permitting the sliding (arrow G) of a platform or carriage 93, by means of a jack 94 whose body is fast to the frame 91 and whose rod is supported on the carriage 93.

On the frame 91, the presence of two flanges 95a and 95b will be noted, arranged on both sides of two rails 92a and 92b and designed, the first to serve as a support for a blade 96 actuated transversely to said rails by means of a jack 97 and the second to serve as a housing for the point of the blade 96 when the latter is actuated by this jack. Obviously, there could be provided a slideway downstream of the support 95a, in order to facilitate the movements of the blade 96.

The latter has the role of piercing through from one side to the other and under the bony portion, a hoofed foot, held on the plane of the platform 93 by means of a gripping member such as a jaw 98 pivoted by a vertical jack 99. The jaw 98 and the jack 99 are arranged on the carriage 93.

In a first stage, the jack 99 is supplied, actuating the jaw 98 which imprisons the foot on the carriage 93.

In a second stage, the jack 97 is supplied, moving the blade 96 which traverses the foot beneath the bone and which becomes engaged in the housing 95b.

In a third stage, the jack 94 is supplied, moving the carriage 93 and the foot held on the latter, in the direction indicated by the arrow G1. Under the action of this movement G1, the blade 96 cuts the carcass of the foot up to its end.

In a fourth and last stage, the jacks 94, 97 and 99 are not supplied, bringing back the jaw, the blade and the carriage to their starting point to process another foot.

Although the invention has only been described with reference to a particular embodiment, it is to be understood that it is in no way limited thereto and that various modifications can be applied thereto.

Thus the initial boning can be carried out by other means than those described. The cutting of the spurs could also take place at any time before the boning operation. The first starting of the boning operation could be carried out also at any moment between the washing of the foot and the second starting of boning, or even after the latter. In the same way, the formation of the cut on the hoof side could be done at any time for the boning operation.

The method according to the invention enables not only an extremely extensive mechanisation, but also a very important increase in production.

In another embodiment, it is possible to carry out, prior to the boning operation, a skinning operation separating the skin from he rest of the carcass. The remainder of the carcass is then subjected to the boning operation whilst the skin is scalded and is then depilated.

The operations of washing, scalding, depilation may be entirely automatized; the operations of dehoofing, cutting off of the spurs, cutting on the hoof side and first starting of the boning could be carried out by a machine combined with the automatic operating cycle, only the loading and the control of the cycle remaining manual.

I claim:

1. In a method of processing bovine feet comprising the steps of washing, dehoofing, scalding, depilating and boning the feet, the improvement wherein said boning step is carried out before said scalding step to obtain a flesh portion separate from a bone portion, said scalding and depilating steps then being carried out on said flesh portion.

2. A method according to claim 1 wherein said boning step includes making at least one cut in one end of said foot to form a flap of said flesh portion, clamping said flap close to said end and pulling said flap in the direction of the other end of said foot.

3. A method according to claim 2, wherein said boning step includes making a cut tangentially to said bone portion from the upper end of the foot on the front side, making an osteo-chondral cut in the other end of said foot, to separate said bone portion from the postero-inferior carti laginous portion, and making another cut tangentially to said bone portion, said other cut connecting, at its ends, said first cut and said osteochondreal cut, thus defining a first antero-superior flap and a second postero-inferior flap.

4. Method according to claim 3, wherein the osteochondral cut is effected by means of a saw inclined with respect to the direction of the foot by an angle comprised between 8° and 14°.

5. Method according to claim 4, wherein said angle is 11°.

6. Method according to claim 1, wherein cuts are formed for boning after having dehoofed the foot and removed the spurs.

7. Method according to claim 1, wherein the feet are depilated by means of a rotary scraper member including orifices bounded by a cutting edge.

8. In a method of processing bovine feet comprising the steps of washing, dehoofing, scalding, depilating, scraping and boning the feet, the improvement wherein said scraping step is carried out before said scalding steps to obtain skin portion separate from a bone and flesh portion, said scalding and depilating steps then being carried out on said skin portion while said bone and flesh portion is submitted to said boning step.

9. In an installation for processing bovine feet comprising washing, dehoofing, scalding, depilating and boning stations and means for transferring said feet from one station to the successive station, the improvement wherein said boning station is located before said scalding station so as to perform the boning operation prior to the scalding operation, and said depilating station follows and scalding station to perform the depilating operation after the scalding operation, and wherein said depilating station comprises means for depilating flesh portions which have been separated from bone portion of said feet.

10. An installation according to claim 9 wherein said scalding station and said depilating station are combined in a sole station comprising said depilating means and means for submitting said flesh portions to a heat fluid.

11. Installation according to claim 9, comprising, in order, a washing station, a dehoofing station, a spur shearing station, a cutting station, a boning station, a scalding station and a depilating station.

12. Installation according to claim 9, wherein the dehoofing station includes two parallel grooved sectors oscillating in rotation in reverse directions, separated from one another, above a horizontal table.

13. Installation according to claim 12, wherein the sectors are eccentric so that the space which separates them is a minimum at the moment of introducing the hoof and then increases.

14. Installation according to claim 9, wherein the spur shearing station includes a fixed shearing cutting edge and a shearing cutting edge borne by a movable arm partially masked by a plate.

15. Installation according to claim 9, wherein the cutting station includes a circular saw whose plane is inclined, with respect to the axis of the foot, by an angle comprised between 8° and 14°.

16. Installation according to claim 15, wherein said angle is 11°.

17. Installation according to claim 9, wherein the boning station includes a fixed gripping member, fast to a frame, and a movable extraction member capable of being moved closer to and further from said fixed member.

18. Installation according to claim 17, wherein the fixed gripping member includes two jaws of which one at least is movable in a plane perpendicular to the direction of said movable member, which also includes two jaws of which one at least is movable in a plane parallel to said direction.

19. Installation according to claim 14, comprising a station having a carriage provided with foot immobilization means, displaceable in one direction, towards the dehoofing station, to present the hoof to it, and in another direction, towards the cutting station, to present the dehoofed end to it.

20. Installations according to claim 19, wherein the carriage has a passage for the spurs and spur-shearing means in this passage.

21. Installation according to claim 9, wherein the depilating station includes a tank in which the scalding is carried out.

22. Installation according to claim 9, wherein the depilating station includes, in a tank, a horizontal rotary plate provided with perforations whose contours form sharp edges directed towards the fleshy carcasses.

23. Installation according to claim 22, wherein said plate is surmounted by a fixed perforated cylinder, defining with the tank a peripheral annular space.

24. Installation according to claim 9, including a pivoting and vertically sliding transfer arm, arranged between a scalding tank and a depilating tank.

25. Installation according to claim 9, including a starting station with a carriage provided with foot immobilization means, a blade actuatable in a direction transverse with respect to the foot and means for moving the carriage and the foot in a direction perpendicular to said blade.

* * * * *